(12) United States Patent
Becker

(10) Patent No.: US 8,820,149 B2
(45) Date of Patent: Sep. 2, 2014

(54) METHOD FOR OSCILLATION MEASUREMENT ON ROTOR BLADES OR WIND POWER INSTALLATIONS

(71) Applicant: Prüftechnik AG, Ismaning (DE)

(72) Inventor: Edwin Becker, Moosinning (DE)

(73) Assignee: Prüftechnik Dieter Busch AG, Ismaning (DE)

( * ) Notice: Subject to any disclaimer, the term of this patent is extended or adjusted under 35 U.S.C. 154(b) by 36 days.

(21) Appl. No.: 13/712,274

(22) Filed: Dec. 12, 2012

(65) Prior Publication Data
US 2013/0167625 A1 Jul. 4, 2013

(30) Foreign Application Priority Data
Dec. 30, 2011 (DE) .......................... 10 2011 057 175

(51) Int. Cl.
*G01M 15/14* (2006.01)

(52) U.S. Cl.
USPC ....................................... 73/112.01

(58) Field of Classification Search
USPC ....................................... 73/112.01
See application file for complete search history.

(56) References Cited

U.S. PATENT DOCUMENTS

| | | | |
|---|---|---|---|
| 6,014,896 A | 1/2000 | Schoess | |
| 6,076,405 A * | 6/2000 | Schoess | 73/587 |
| 6,192,759 B1 * | 2/2001 | Schoess | 73/583 |
| 6,525,518 B1 * | 2/2003 | Garnaes | 324/76.13 |
| 6,704,664 B2 | 3/2004 | Su et al. | |
| 7,802,058 B1 | 9/2010 | Miller et al. | |
| 7,883,319 B2 | 2/2011 | Volkmer | |
| 8,066,486 B2 | 11/2011 | Christinsen et al. | |
| 8,170,810 B2 * | 5/2012 | Volkmer | 702/41 |
| 8,197,207 B2 * | 6/2012 | Petersen et al. | 416/61 |
| 2008/0206052 A1 * | 8/2008 | Volkmer | 416/61 |
| 2010/0082276 A1 * | 4/2010 | Becker | 702/56 |
| 2010/0209247 A1 * | 8/2010 | Becker et al. | 416/1 |
| 2011/0049886 A1 * | 3/2011 | Becker et al. | 290/44 |

FOREIGN PATENT DOCUMENTS

| | | |
|---|---|---|
| DE | 10 2009 029 280 A1 | 3/2011 |
| DE | 20 2011 001 901 U1 | 4/2011 |

OTHER PUBLICATIONS

Kovarianzanalyse, Oct. 16, 2011, Wikipedia [Online], First Paragraph Translated to English.
Patrick Ragan and Lance Manuel, Comparing Estimate of Wind Turbine Fatigue Loads Using Time-Domain and Spectral Methods, Reprinted From Wind Engineering, vol. 31, No. 2, 2007, pp. 83-99, Multi-Science Publishing Company, 5 Wates Way, Brentwood, Essex CM15 9TB, UK.

* cited by examiner

*Primary Examiner* — Freddie Kirkland, III
(74) *Attorney, Agent, or Firm* — Roberts Mlotkowski Safran & Cole, P.C.; David S. Safran

(57) ABSTRACT

Method for spectral evaluation of oscillation signals which have been obtained on a rotor blade of a wind power installation with an accelerations sensor. In doing so, instead of the otherwise conventional Fourier transform calculation, the spectral power density is computed. In the evaluation, also signal portions are considered which are not detected in the Fourier transform because they do not go back to oscillations which have been excited in the rotor blade.

15 Claims, 3 Drawing Sheets

METHOD FOR OSCILLATION MEASUREMENT ON ROTOR BLADES OR WIND POWER INSTALLATIONS

BACKGROUND OF THE INVENTION

1. Field of the Invention

The invention relates to a method for evaluating oscillation signals on rotor blades of wind power installations.

2. Description of Related Art

U.S. Pat. No. 7,883,319 describes a method in which the loading of rotor blades is determined and spectrally evaluated using accelerometers. The acceleration sensors generate an electrical signal which reproduces the oscillation state of a rotor blade. This electrical signal is further processed electronically by spectra being computed. A Fourier transform is named as the sole example for computing the spectra. The oscillations are excited by the operation of the wind power installation or by the wind which is incident on the blade.

German Patent Application DE 10 2009 029 280 describes an unbalance measurement in which the spectral power density is evaluated for evaluation of the oscillation signal. The unbalance is measured in a balancing machine, therefore not during operation of the article which is to be tested for its unbalance. The oscillation sensors are located on the balance machine on the bearings for the rotating body which is to be balanced.

In the automotive supply industry, components are subjected to a loading test on test benches by their being excited on a vibration table with specific signal shapes. Excitations with a shaker are also common. In the evaluations carried out there, the spectral power density is recorded. Attempts to transfer this type of evaluation to rotor blades of wind power installations dictate generally large and heavy devices for excitation of oscillations in the rotor blades or for application of loads to the rotor blades. Smaller devices as proposed in German Patent Application DE 20 2011 001 901 always necessitate shutdown of the wind power installation. Thus, these methods cannot be carried out during operation of a wind power installation.

SUMMARY OF THE INVENTION

A primary object of this invention is to provide an improved method for making available the spectra and other possibilities for evaluation of the spectra which enable more and more reliable conclusions about the state of the rotor blade. It is to be possible to carry out this method during the operation of the installation.

This object is achieved in that an improved method is given which does not require use of a Fourier transform, but is based on the evaluation of the spectral power density. It is especially advantageous here that, different from known methods using a Fourier transform, not only the excited natural oscillations which contain energy are recognized, but also energy absorbing states of the rotor blades. Thus, the possibilities for analysis of rotor blades of wind power installations with respect to their loading and damage resulting therefrom are improved.

BRIEF DESCRIPTION OF DRAWINGS

FIG. 1b is a cross-sectional view of the blade looking toward the hub.

DETAILED DESCRIPTION OF THE INVENTION

Figure 1A:
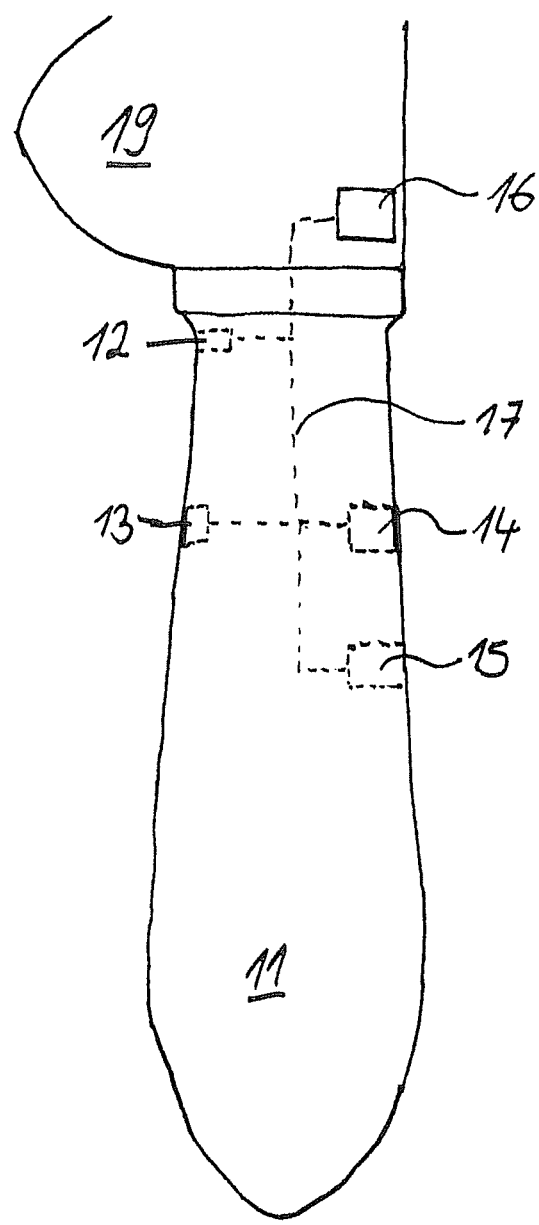
FIGS. 1a & 1b schematically show a rotor blade of a wind power installation with oscillation sensors, FIG. 1a be an elevational of a hub one blade of the wind power installation.

FIG. 1a schematically shows a rotor blade 11 of a wind power installation. The method in accordance with the invention is, however, carried out during operation of the installation, the rotor blade being connected to the remaining installation. In the rotor blade in the vicinity of a flange for connection of the blade to a hub 19, an oscillation sensor 12 is mounted and is connected to evaluation electronics 16 within the hub 19. Here, the connection 17 between the evaluation electronics which can contain a power supply is, likewise, shown. In this case, the connection takes place via a wire line. However, it can also take place wirelessly, the power supply of the sensor then taking place via a battery contained in the sensor or via an energy harvester.

However, the invention can also be implemented with one or more sensors 13-15 which is/are mounted elsewhere inside or outside of the rotor blade. Advantageously, the sensors will be mounted near sites of comparatively high mechanical loading, such as stresses, which sites have been determined using structural-mechanical methods, therefore near the blade root, on webs, chords and/or locations at which the cross section of the rotor blade changes. The components with reference numbers 12-17 are shown in FIG. 1a by the broken line because they are located within the rotor blade or the hub of the wind power installation.

Figure 1B:
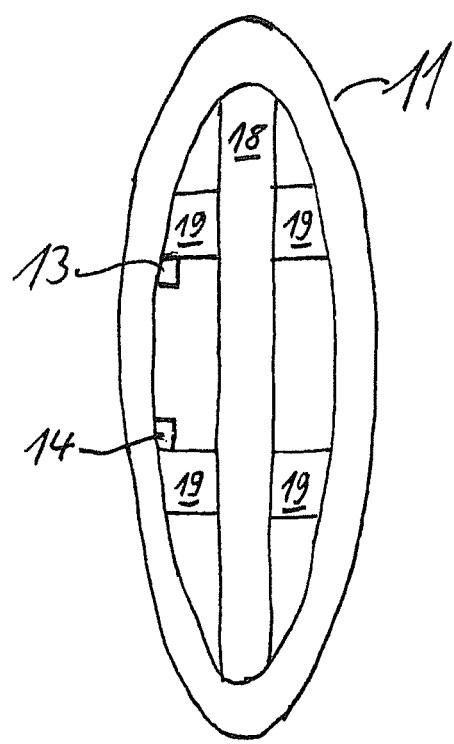

FIG. 1b shows the rotor blade in cross section with webs and chords 18, 19 and two oscillation sensors 13, 14.

In operation, the sensors detect oscillations from different sources. Operating noise and wind noise are the stochastically acting causes of these oscillations. These factors cause the required excitation of the rotor blade. In doing so, stochastic (to the speed of the wind power installation) harmonic and transient signals occur.

These oscillations are detected by the sensors, digitized and further processed in the evaluation electronics. This further processing of the signals includes, for example, a Fourier or Wigner transform or a wavelet analysis. A line spectrum is formed in which the excited oscillations can be recognized as lines on a noisy background. The Fourier transform can, however, can be omitted in steady-state processes. Instead of the Fourier transform, in accordance with the invention, the spectral power density is computed. In the representation of the spectra, a logarithmic representation as a MSS (means square spectrum) or RMS (root mean square spectrum) of the parameter of the oscillation acceleration is preferred. Thus, in addition to the line spectra of the natural oscillations and excited oscillations which are known from Fourier spectra, lines in the background can also be recognized which occur at frequencies in which the power of the excitation signal is absorbed by the rotor blade. These excitations, which do not trigger oscillations, but result, for example, in local heating are not visible in a spectrum which has been determined by means of a Fourier transform, because an excited oscillation is not contained in the signal. Therefore, in the description of the power density spectrum LDS, the spectral power is reproduced in a finite frequency interval as a MSS (mean square spectrum) or RMS (Root means square spectrum, i.e., the root of the MSS). The power density spectrum is also called the power spectral density. Here, the length of the frequency interval can also be given as the resolution bandwidth (RBW).

The evaluation of these power-absorbing lines compared to the corresponding line in the intact state, therefore, for example, in a newer rotor blade, or in a comparison of different rotor blades of the same wind turbine or several rotor blades of the same type on different wind turbines, however, likewise, makes available information about the loading and the actual state of the respective rotor blade.

Figure 2A:
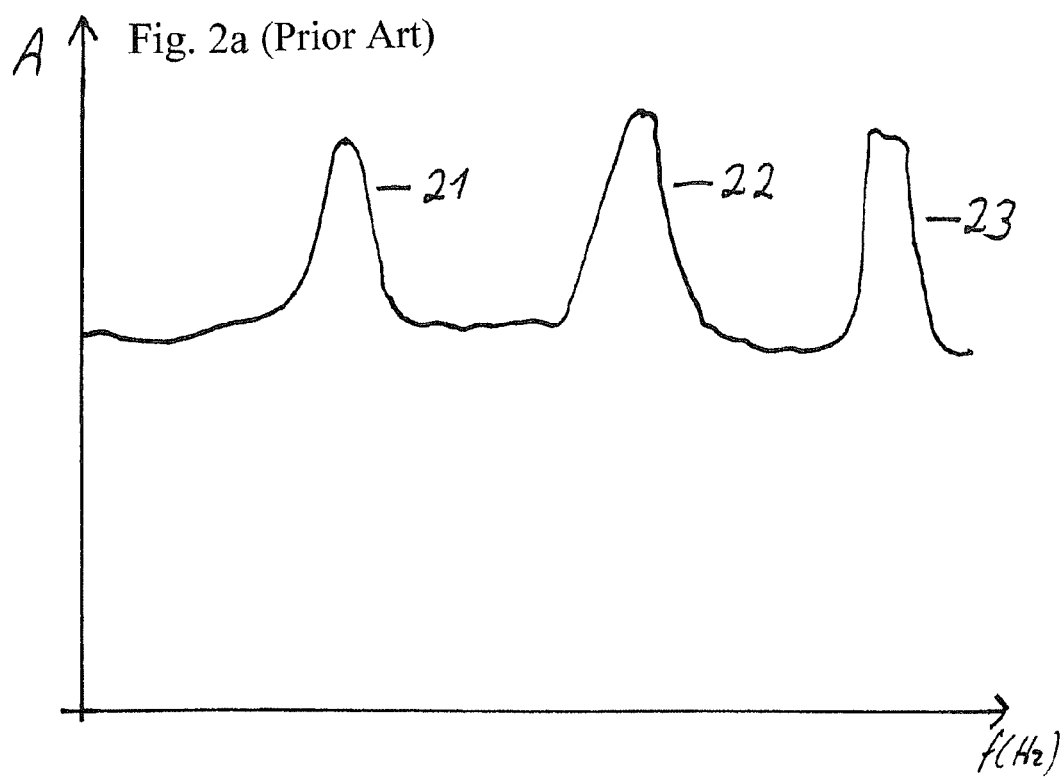
FIG. 2a is a plot of the spectrum of a rotor blade of a wind power installation, which spectrum is obtained with a Fourier transform according to the prior art.

FIG. 2a shows a spectrum which, as in the prior art, has been obtained by evaluation of the acceleration signal by means of a Fourier transform, in a conventional plot, therefore, showing the amplitude of the acceleration as a function of the frequency. In the spectrum, lines 21, 22, 23 can be recognized. These lines are all rises of the amplitude of the acceleration at certain frequencies and correspond to excited natural oscillations. Thus, these lines are a measure of the loading of the rotor blades and enable conclusions about the loading of the rotor blade when the location of the oscillation sensor and the mechanical structure of the rotor blade are considered.

Figure 2B:
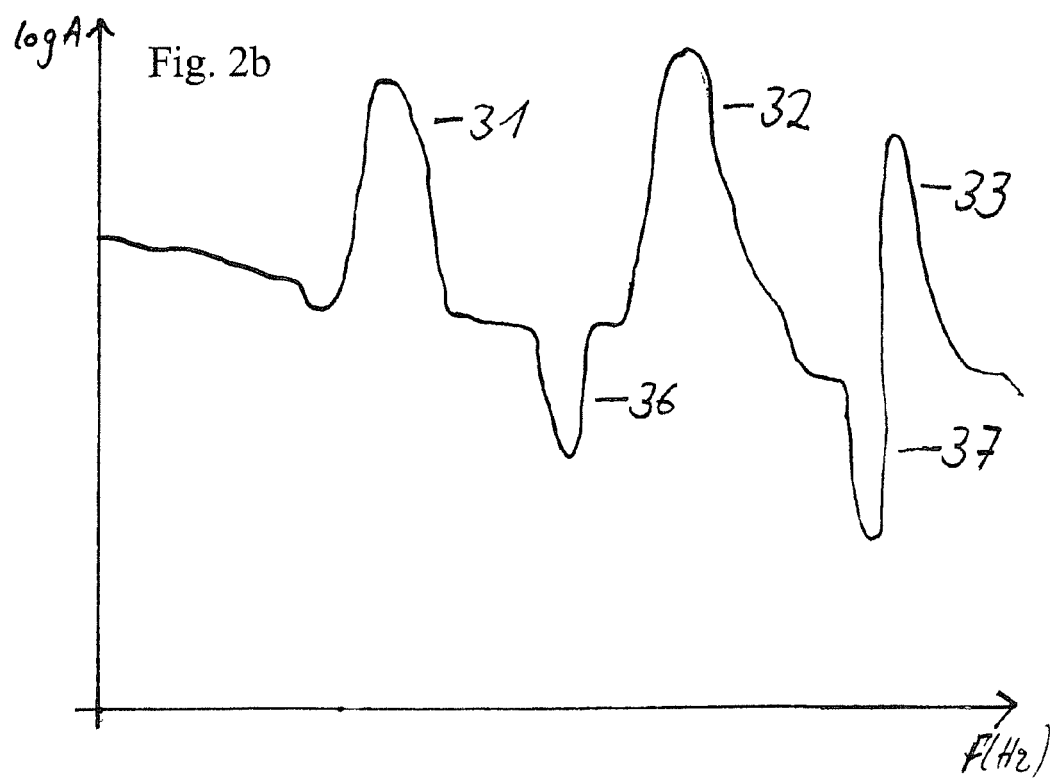
FIG. 2b is a plot of a power density spectrum which has been obtained in accordance with the invention.

FIG. 2b shows a spectrum which has been obtained by evaluation of the acceleration signal as the spectral power density, in a logarithmic plot of the amplitude of the acceleration as a function of the frequency. In the spectrum again the lines 31, 32, 33 can be recognized. These lines correspond to lines 21, 22, 23 of FIG. 2a. In addition, at this point however, lines 36 and 37 are recognizable. At the pertinent frequencies, the rotor blade now absorbs energy which also contributes to loading of the rotor blade. In accordance with the invention, these lines which were not accessible by existing methods are also used as a measure for the loading of the rotor blade and for information about loading of the rotor blade, and again, the location of the oscillation sensor and the mechanical structure of the rotor blade being considered.

Here, it is advantageous if, on a new installation, a rotor blade which has been found to be good with other methods is used as the reference by a power density spectrum being stored in the evaluation electronics 16 or another computer. A spectrum of this rotor blade can likewise be used as a reference. The spectrum of this reference can then be compared to the current LDS at any later time. In these comparisons, data about excitations (for example, wind intensity and other meteorological data), technical data of the wind power installation (type, transmission, generator) and data about operating states (speed, instantaneous angular position of the rotor blade directly in front of the tower pointing vertically down) can be considered.

Thus, it is possible to better track and monitor the development of an individual rotor blade over time and also to make comparisons between different rotor blades. Here, a comparison between the rotor blades of the same wind power installation is possible in the same manner as a comparison between rotor blades of the same wind park or even between rotor blades of the same type on wind power installations of different types.

With respect to structural mechanical considerations for determining the rotor blade loading based on the lines in the Fourier spectrum or the power density spectrum LDS, the advantage of the power density spectrum now becomes recognizable. Not only are excited oscillations detected, but also other loads which have been introduced into the rotor blade are recognized. They arise in the operation of the wind power installation, and in the same manner, as the excited oscillations, especially natural oscillations, lead to structural damage in the rotor blade such as delaminations, cracks or breaks. Covering of the rotor blade with moisture or ice which also represents a load and thus loading for the rotor blade, can become recognizable in this way. Although they cannot be recognized as excited oscillations in the conventional linearly plotted Fourier spectrum, they can be recognized by means of the representation in accordance with the invention. Thus, the possibilities of early recognition of damage are improved. The use of methods of covariance analysis, such as autocovariance functions, autocorrelation functions, etc. is especially advantageous.

Furthermore, it is advantageous to intervene into the control of the wind power installation with the additional information about the loading of the rotor blade which is obtained in accordance with the invention, especially into the pitch adjustment of the rotor blade or the setting of individual movable elements (flaps) on the rotor blade.

What is claimed is:

1. A method for determining the loading of a rotor blade of a wind power installation, comprising the steps of:
   recording of an oscillation signal obtained by means of at least one oscillation sensor which is attached to a rotor blade of a wind power installation
   spectrally evaluating the oscillation signal as a function of frequency as a spectral power density, and
   comparing the spectrally evaluated oscillation signal to a reference spectrum,
   wherein said evaluating step includes using the contribution of energy absorption by the rotor blade for obtaining information about loading of the rotor blade.

2. The method in accordance with claim 1, wherein the at least one oscillation sensor is attached at at least one location with high structural loading.

3. The method in accordance with claim 1, wherein a covariance analysis is undertaken for evaluation of the oscillation signals.

4. The method in accordance with claim 1, wherein the result of comparing the spectrally evaluated oscillation signal to a reference spectrum is used to intervene in controlling of the wind power installation.

5. The method in accordance with claim 4, wherein intervention into the in controlling of the wind power installation comprises one of controlling pitch adjustment of the rotor blade and setting of individual movable elements of the rotor blade.

6. A method for determining the loading of a rotor blade of a wind power installation, comprising the steps of:
   recording of an oscillation signal obtained by means of at least one oscillation sensor which is attached to a rotor blade of a wind power installation
   spectrally evaluating the oscillation signal according to a parameter of a logarithm of an acceleration signal as a function of frequency and
   comparing the spectrally evaluated oscillation signal to a reference spectrum,
   wherein said evaluating step includes using the contribution of energy absorption by the rotor blade for obtaining information about loading of the rotor blade.

7. The method in accordance with claim 6, wherein the at least one oscillation sensor is attached at at least one location with high structural loading.

8. The method in accordance with claim 6, wherein a covariance analysis is undertaken for evaluation of the oscillation signals.

9. The method in accordance with claim 6, wherein information obtained from the oscillation signals is used to control the wind power installation.

10. A method for determining the loading of a rotor blade of a wind power installation, comprising
    recording of an oscillation signal by means of at least one oscillation sensor which is attached to at least one rotor blade of a wind power installation,
    spectrally evaluating the oscillation signal, and
    comparing the spectrally evaluated oscillation signal to a reference spectrum as a means square spectrum,
    wherein said evaluating step includes using the contribution of energy absorption by the rotor blade for obtaining information about loading of the rotor blade.

11. The method in accordance with claim 10, wherein the oscillation sensor is attached at locations with high structural loading.

12. The method in accordance with claim 10, wherein a covariance analysis is undertaken for evaluation of the oscillation signals.

13. The method in accordance with claim 10, wherein the information obtained from the oscillation signals is used to control the wind power installation.

14. The method in accordance with claim 10, wherein the result of comparing the spectrally evaluated oscillation signal to a reference spectrum is used to intervene in controlling of the wind power installation.

15. The method in accordance with claim 14, wherein intervention into the in controlling of the wind power installation comprises one of controlling pitch adjustment of the rotor blade and setting of individual movable elements of the rotor blade.

\* \* \* \* \*